United States Patent
Shi

(10) Patent No.: US 11,019,259 B2
(45) Date of Patent: May 25, 2021

(54) REAL-TIME GENERATION METHOD FOR 360-DEGREE VR PANORAMIC GRAPHIC IMAGE AND VIDEO

(71) Applicant: IDEAPOOL CULTURE & TECHNOLOGY CO., LTD., Beijing (CN)

(72) Inventor: Pengcheng Shi, Beijing (CN)

(73) Assignee: IDEAPOOL CULTURE & TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/474,103

(22) PCT Filed: Dec. 19, 2017

(86) PCT No.: PCT/CN2017/117071
§ 371 (c)(1),
(2) Date: Jun. 27, 2019

(87) PCT Pub. No.: WO2018/121333
PCT Pub. Date: Jul. 5, 2018

(65) Prior Publication Data
US 2020/0128178 A1    Apr. 23, 2020

(30) Foreign Application Priority Data
Dec. 30, 2016 (CN) .......................... 201611253932.2

(51) Int. Cl.
*H04N 5/232* (2006.01)
*G02B 27/01* (2006.01)
(Continued)

(52) U.S. Cl.
CPC ..... *H04N 5/23238* (2013.01); *G02B 27/0172* (2013.01); *G06T 15/205* (2013.01);
(Continued)

(58) Field of Classification Search
CPC ............. H04N 5/23238; H04N 13/117; G02B 27/0172; G02B 2027/0178; G06T 15/205; G06T 19/006
See application file for complete search history.

(56) References Cited

U.S. PATENT DOCUMENTS

2004/0196282 A1    10/2004   Oh
2014/0189698 A1*   7/2014    Choquette ............. G06F 9/3887
                                                          718/103
(Continued)

FOREIGN PATENT DOCUMENTS

CN    102945563 A    2/2013
CN    102945563 A    2/2013
(Continued)

OTHER PUBLICATIONS

PCT International Search Report dated Mar. 7, 2018 for PCT/CN2017/117071 filed Dec. 19, 2017.
(Continued)

*Primary Examiner* — Chong Wu
(74) *Attorney, Agent, or Firm* — Schmeiser, Olsen & Watts, LLP

(57) ABSTRACT

A real-time generation method for a 360-degree VR panoramic graphic image is provided. The method includes: determining a current camera location and scenario information; rendering a three-dimensional graphic image in a scene photographed by the camera onto a space projection object in real time, and performing combined rendering and capturing and combination to form a fully surrounding panoramic CUBE texture map; in a viewing angle range of 360 degrees, performing spherical projection and second rendering on the texture of the panoramic CUBE texture map, and converting same into a rendered object to generate a panoramic scenario map; and outputting the generated panoramic scenario map via a video IO card to obtain a
(Continued)

360-degree VR panoramic graphic image with a key signal. In addition, also provided is a real-time generation method for a 360-degree VR panoramic graphic image video.

6 Claims, 4 Drawing Sheets

(51) Int. Cl.
*G06T 15/20* (2011.01)
*G06T 19/00* (2011.01)
*H04N 13/117* (2018.01)

(52) U.S. Cl.
CPC .... *G06T 19/006* (2013.01); *G02B 2027/0178* (2013.01); *H04N 13/117* (2018.05)

(56) References Cited

U.S. PATENT DOCUMENTS

2015/0321103 A1 11/2015 Barnett et al.
2018/0007389 A1 1/2018 Izumi

FOREIGN PATENT DOCUMENTS

| CN | 106157359 A | 11/2016 |
| CN | 107133918 A | 9/2017 |
| JP | WO2016140082 A1 | 12/2017 |
| WO | WO2016140082 A1 | 12/2017 |

OTHER PUBLICATIONS

PCT International Search Report for PCT/CN2017/117071 filed Dec. 19, 2017.

* cited by examiner

REAL-TIME GENERATION METHOD FOR 360-DEGREE VR PANORAMIC GRAPHIC IMAGE AND VIDEO

CROSS-REFERENCE TO RELATED APPLICATIONS

This application claims priority to PCT Application No. PCT/CN2017/117071, having a filing date of Dec. 19, 2017, based on Chinese Application No. 201611253932.2, having a filing date of Dec. 30, 2016, the entire contents both of which are hereby incorporated by reference.

FIELD OF TECHNOLOGY

The following relates to the field of computer graphics image tracking processing, in particular to a 360 degree VR panoramic graphics image and a real-time generating method of video.

BACKGROUND

VR is the abbreviation of Virtual Reality and means virtual reality in Chinese. 360 VR video is a 360×180 panoramic video image rendered by VR technology, which enables strong immersion and interaction in mobile phones, helmets, PCs and other devices. This emerging video model has developed rapidly in recent years and has become an important means of communication for the development of multiple media such as planes, televisions, movies, and networks. It is also a key commercial market with software and hardware manufacturers.

In the existing products and technologies, the development of 360-degree panoramic video camera equipment (panoramic camera) and viewing equipment (VR glasses) are focused only, which can only perform simple VR video shooting, stitch stitching and live broadcast functions. At present, the technology and method on the 360-degree panoramic 3D graphics engine in the middle are relatively simple, and there are also problems such as single function and complicated operation.

In the 360-degree panoramic video broadcast, there is currently no good way to add panoramic graphic text. The patent application of the application No. 201210365946.9 discloses a system and method for displaying and interacting a panoramic video, which simply renders the panoramic video onto the 3D model, wherein the graphic image and the text are not processed, and the 360 degree VR panorama cannot be realized. The playback of graphic images. The traditional graphic image system is mainly used for superimposing video signals captured by ordinary cameras, such as 1080 50i, 1080 50P, etc., and the computer generates ordinary perspective projection graphic images, so that the output video and the 360-degree panoramic video format are generally 4K 25P, 4K 50P, 4K 120P or 8K 25P system, and the frame is at least 4K, the picture is also real-time stitching processing, if the traditional graphic image is up-converted and superimposed (frame size is increased), in addition to the picture quality can not be guaranteed, The perspective projection of the graphic image and the panoramic video cannot be fused at all in the spatial and perspective relationship, so that the picture sound is rigid and does not make the viewer feel immersed in the current video. The shortcomings of the above conventional graphic image processing systems and methods greatly limit the development of the VR video industry.

SUMMARY

An aspect relates to a real-time generating method for a 360-degree VR panoramic graphic image and a real-time generating method for the video including the 360-degree VR panoramic graphic image to solve the traditional graphic image processing methods in the known art. Among the traditional graphic image processing methods, there are simple methods, single functions, complicated operations, unable to guarantee picture quality, perspective projection of graphic images and panoramic video in the spatial and perspective relationship cannot be integrated and the picture and sound rigid and rigid technology problem.

The method for real-time generation of 360 degree VR panoramic graphic image provided by embodiments of the invention comprises:

Determining camera position information, determining current camera position and scene information according to preset settings or information of external devices;

Generating a panoramic CUBE texture map, and rendering all the three-dimensional graphic images in the scene captured by the camera to the spatial projection object in real time according to the change of the scene information, performing combined rendering and capturing & merging to form a full-enclosed panoramic CUBE texture map;

Generating a panoramic scene map, using the texture of the panoramic CUBE texture map as a data source, performing spherical projection and re-rendering on the texture of the panoramic CUBE texture map within a 360-degree angle of view, and performing a conversion operation to convert the CUBE texture The data calculation is converted into a rendering target with a width and height of 3840 pixels and 2160 pixels respectively, and a 4K panoramic scene map is generated; wherein the aspect ratio of the 4K panoramic scene map is optionally 2:1.

A 360-degree VR panoramic graphic image is generated, and the generated panoramic scene texture is extracted for texture data, and output to a rendered result data queue, and the rendered result data is output through a video IO card to obtain a 360-degree VR panoramic graphic image with a key signal.

Optionally, in the step of generating a CUBE texture map, real-time rendering all the three-dimensional graphics images onto the spatial projection object comprises the following steps:

Establishing a local three-dimensional coordinate system with the camera position as an origin;

Projecting objects in the scene along the X, –X, Y, –Y, Z, and –Z axes of the three-dimensional coordinate system at a viewing angle of 90 degrees, and performing six combined renderings, combining A sky bounding box with six textured faces forms a six square texture map to form the fully enclosed CUBE texture map. The panoramic CUBE texture map is centered on the camera, and includes rendered textures of all objects in the scene.

After generating the panoramic scene texture at the end of each panoramic rendering, the graphics acceleration card is sent an instruction to obtain a texture data object interface, the texture object is locked, the texture data is obtained, and then the texture object is unlocked, and the texture data is obtained through these links.

In an optional implementation manner of embodiments of the present invention, in the step of generating a 360 degree VR panoramic graphic image, the step of outputting the panoramic scene texture to the rendered result data queue is:

i) setting the critical lock and under its protection, taking the data address from the empty data queue header, updating the calculated latest data, adding a timestamp and a parity field identifier to the data block, and adding the data block to the data to be broadcasted At the end of the queue, the empty data queue is used to store the rendered result;

ii) in the video broadcast thread, when the broadcast instruction is obtained, under the critical lock protection, according to the broadcast state, the data to be broadcasted and identified correctly is taken out from the head of the data queue to be broadcasted, and sent to the board for broadcast;

iii) Put the broadcasted data cache into the end of the empty data queue to form a queue of 8-shaped structures.

In addition, embodiments of the present invention also provides a real-time video generation method with a 360 degree VR panoramic graphic image, which is characterized in that a panoramic video signal generated by a panoramic camera is input, and a panoramic video and a 360 degree VR panoramic graphic image are displayed. Superimpose to generate a video with a 360 degree VR panoramic graphic image.

Optionally, the panoramic video and the 360 degree VR panoramic graphic image are superimposed in an internal key manner, and the specific steps are:

a) synchronizing the panoramic camera to the BB signal of the signal generator;

b) input the panoramic video signal generated by the panoramic camera in real time, superimpose the panoramic graphic image, the panoramic video, and then output the video.

In addition, the panoramic video and the 360 degree VR panoramic graphic image may be superimposed by using an external key, and the specific steps are as follows:

a') uniformly synchronizing the panoramic camera, the 4K keyer\switching station and the 360 degree VR panoramic graphic image signal to the BB signal of the signal generator;

b') The panoramic video signal and the panoramic graphic image signal are unified on the 4K key controller\switching table and to be superimposed, then to be output.

Through the above method, embodiments of the invention overcomes the defects that the traditional graphic image processing method has the advantages of simple method, single function, complicated operation, and cannot guarantee picture quality, so that the perspective image and the panoramic video can be completely accurate in spatial and perspective relationship. The fusion of the images enables the natural integration of graphic images and video, creating an immersive 360-degree virtual environment for the audience, deepening the audience's immersion in the virtual 360-degree virtual graphic image and video, greatly enhancing the audience's virtual reality sense. Experience.

BRIEF DESCRIPTION

Some of the embodiments will be described in detail, with references to the following Figures, wherein like designations denote like members, wherein.

Figure 4A:
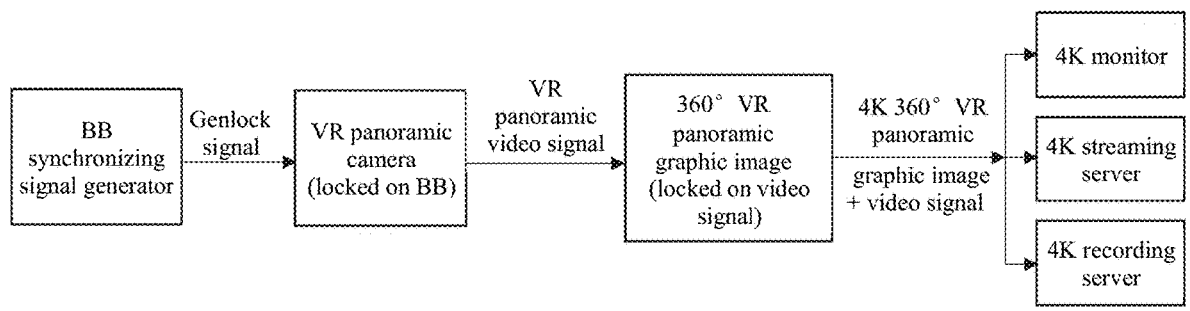
Figure 4B:
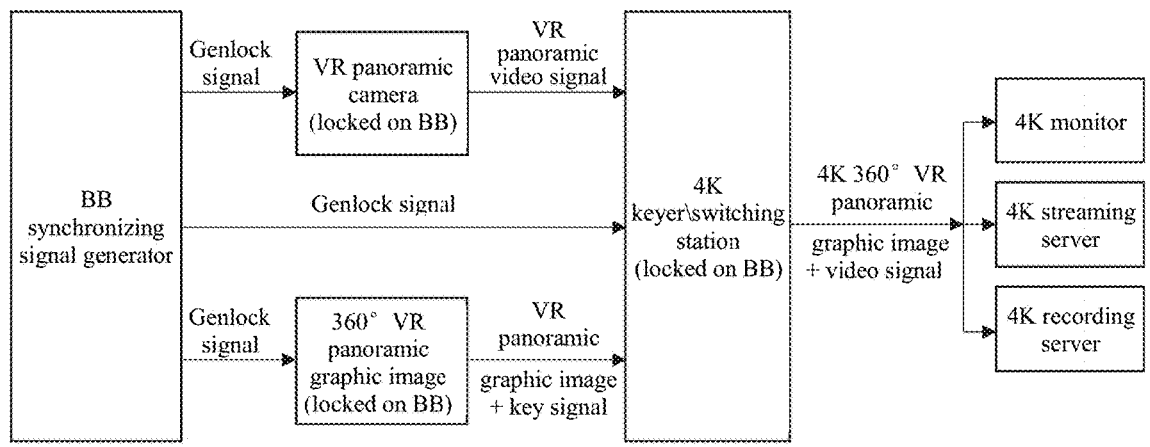

FIG. 4(a) is a panoramic video and an internal key and an external key in a video real-time generating method for a 360-degree VR panoramic graphic image according to an embodiment of the present invention. A schematic diagram of superimposition of the 360 degree VR panoramic graphic image; and FIG. 4(b) is a panoramic video and an internal key and an external key in a video real-time generating method for a 360-degree VR panoramic graphic image according to an embodiment of the present invention. A schematic diagram of superimposition of the 360 degree VR panoramic graphic image.

DETAILED DESCRIPTION

The following will be further described in detail below with reference to the accompanying drawings, and the embodiments described below are merely examples of embodiments of the present invention, which are only used to more clearly embodiments of the present invention. The explanation and description are not intended to limit the scope of embodiments of the invention.

Figure 1:
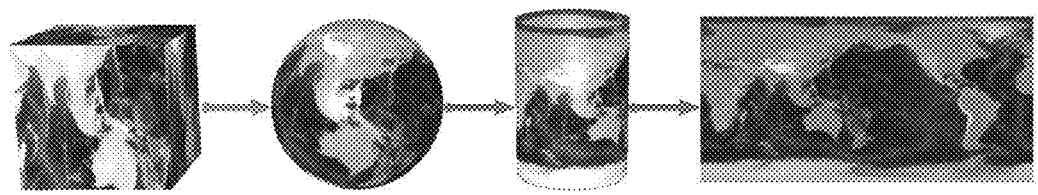
FIG. 1 is a schematic diagram showing the principle of a 360 degree VR panoramic graphic image real-time generating method according to embodiments of the invention.

Referring to FIG. 1, FIG. 1 is a schematic diagram of a method for real-time generation of a 360 degree VR panoramic graphic image according to embodiments of the invention. The embodiments render a full-enclosed panoramic CUBE texture map by real-time rendering a three-dimensional graphic image in a scene captured by the camera onto a spatial projection object, and then forming a full-enclosed panoramic CUBE texture map; and then the panoramic CUBE texture in a 360-degree viewing angle range The texture of the texture is spherically projected and rendered twice, and converted into a render target, which ultimately produces a panoramic scene map. The 360 degree VR panoramic graphic image generating method of embodiments of the invention can meet the requirements of real-time 4K rendering and broadcasting through the IDPRE® VR panoramic video three-dimensional graphics rendering engine.

Figure 2:
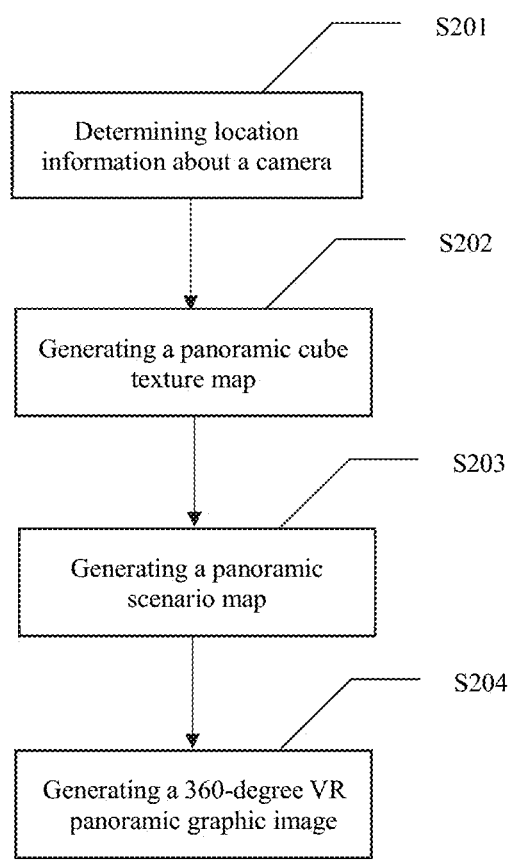
FIG. 2 is a flowchart of a method for generating a 360 degree VR panoramic graphic image according to embodiments of the present invention.

Referring to FIG. 2, embodiments of the present invention proposes a 360 degree VR panoramic graphic image real-time generation method. As shown in FIG. 2, the method includes:

S201: Determine camera position information: determine current camera position and scene information according to preset settings or information of an external device;

S202: Generate a panoramic CUBE texture map: according to the change of the scene information, use the GPU to perform a three-dimensional CUBE projection map rendering operation on all the three-dimensional graphic images in the scene captured by the camera, thereby real-time rendering the three-dimensional graphic image onto the spatial projection object. The three-dimensional graphics scenes of the upper, lower, left, and right front and back are separately combined and captured and captured to form a CUBE rendering texture of all-round, full-enclosed and full-scenario;

S203. Generate a panoramic scene map: using the texture of the panoramic CUBE texture map as a data source, performing spherical projection and secondary rendering on the texture of the panoramic CUBE texture map by a GPU in a 360-degree view angle, in a 360-degree view The projection rendering operation is performed on the CUBE texture data, and the CUBE texture data calculation is converted into a rendering target with a width and height of 3840 pixels and 2160 pixels respectively, and a 4K panoramic scene map is generated; wherein the aspect ratio of the rendering target can be The selection is 2:1.

S204, generating a 360 degree VR panoramic graphic image: extracting the generated panoramic scene texture for texture data, outputting to the rendered result data queue, and outputting the rendered result data through a 4K Video IO card to obtain a 360 degree VR panorama Graphic image with a key signal.

In practical applications, based on the method of embodiments of the present invention, the 3D scene content in the 4K system can be more efficiently displayed by optimizing the GPU algorithm of DirectX and the rendering and broadcasting technology of IDPRE® (VR panoramic video 3D graphics rendering engine).

Optionally, in the step of generating a CUBE texture map, real-time rendering all the three-dimensional graphics images onto the spatial projection object comprises the following steps:

Establishing a local three-dimensional coordinate system with the camera position as an origin;

Projecting objects in the scene along the X, -X, Y, -Y, Z, and -Z axes of the three-dimensional coordinate system at a viewing angle of 90 degrees, and performing six combined renderings, combining A sky bounding box with six textured faces forms a six square texture map to form the fully enclosed CUBE texture map. The panoramic CUBE texture map is centered on the camera, and includes rendered textures of all objects in the scene.

After generating the panoramic scene texture at the end of each panoramic rendering, the graphics acceleration card is sent an instruction to obtain a texture data object interface, the texture object is locked, the texture data is obtained, and then the texture object is unlocked, and the texture data is obtained through these links.

Figure 3:
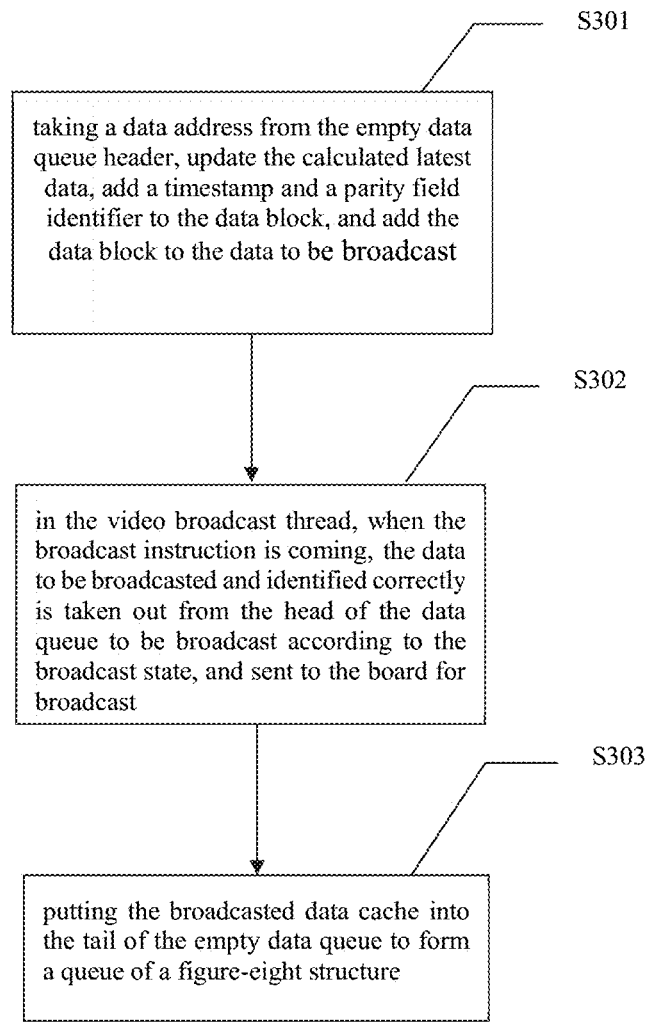
FIG. 3 is a flow chart of outputting a panoramic scene map to a rendered result data queue in the step of generating a 360 degree VR panoramic graphic image in the flowchart shown in FIG. 2.

Referring to FIG. 3, based on the method shown in FIG. 2, in an optional implementation manner, in the step of generating a 360 degree VR panoramic graphic image, the step of outputting the panoramic scene texture to the rendered result data queue is:

S301: Set a critical lock and, under its protection, take a data address from the empty data queue header, update the calculated latest data, add a timestamp and a parity field identifier to the data block, and add the data block to the data to be broadcast. At the end of the queue, the empty data queue is used to store the rendered result;

S302, in the video broadcast thread, when the broadcast instruction is obtained, under the protection of the critical lock, the data to be broadcasted and identified correctly is taken out from the head of the data queue to be broadcast according to the broadcast state, and sent to the board for broadcast;

S303: Put the broadcasted data cache into the tail of the empty data queue to form a queue of a figure-eight structure.

In the actual application process, embodiments of the present invention generally improves the 3D rendering technology of the GPU+CPU by improving the MMX instruction set and the SSE instruction set, and satisfies the three-dimensional object creation, rendering, texture special effects in the 360 degree 4K panoramic rendering environment. 3D panoramic image production and broadcast effects such as animation effects, shaders, and file formats.

Based on the above method of embodiments of the present invention, it is possible to construct a dedicated fast creation software for VR panoramic three-dimensional graphics and a VR panoramic video live broadcast and dedicated control software, by which VR panoramic video signals, three-dimensional graphic templates, real-time external data, etc. can be used. The video material is combined to generate a 360-degree panoramic image signal with a key signal in real-time, combined with an external device, using a standard 4K SDI video signal interface, with a VR panoramic camera, a 4K switcher, a 4K video server, and a 4K button. A standard video production device such as a controller generates a 360-degree panoramic video program signal with a graphic image to form a complete system that satisfies the live broadcast of the VR panoramic video program.

In addition, embodiments of the present invention also provides a real-time generating method for 360 degree VR panoramic graphic image video. Referring to FIG. 4(a) and FIG. 4(b), the method can input a panoramic video signal generated by a panoramic camera, and superimpose the panoramic video and the 360-degree VR panoramic graphic image to generate a 360-degree VR panoramic graphic. The video of the image.

As shown in FIG. 4(a), optionally, the panoramic video and the 360-degree VR panoramic graphic image are superimposed in an internal key manner, and the specific steps are as follows:

a) synchronizing the panoramic camera to the BB signal of the signal generator;

b) input the panoramic video signal generated by the panoramic camera, superimpose the panoramic graphic image, the panoramic video, and then output the video.

As shown in FIG. 4(b), the panoramic video and the 360-degree VR panoramic graphic image may be superimposed in an external key manner. The specific steps are as follows:

a') uniformly synchronizing the panoramic camera, the 4K keyer\switching station and the 360 degree VR panoramic graphic image signal to the BB signal of the signal generator;

b') The panoramic video signal and the panoramic graphic image signal are unified on the 4K key controller\switching table, and then output.

In addition, in the actual application process, the method of embodiments of the present invention can also switch the manner of selecting the panoramic camera channel, trigger the real-time switching of the relevant 360 degree VR panoramic graphic image scene, and convert the graphic image rendering effect, or can deploy multiple 360 degrees. VR panoramic graphics rendering service to achieve multi-channel multi-camera 360-degree panoramic graphics system.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The claims are as follows:

1. A real-time generating method for a 360-degree VR panoramic graphic image, the method comprising:
   determining camera position information by determining a current camera position and scene information according to a preset setting or information of an external device;
   generating a panoramic CUBE texture map according to a change of the scene information, all the three-dimensional graphic images in a scene captured by a camera are real-time rendered onto a spatial projection object, and combined rendering and capturing are performed to form a full-enclosed panoramic CUBE texture map;

generating a panoramic scene map, wherein a texture of the panoramic CUBE texture map is used as a data source, and the texture of the panoramic CUBE texture map is spherically projected and re-rendered within a 360-degree angle of view, and converted into a rendering target, and then generating a 4K panoramic scene map; and generating a 360 degree VR panoramic graphic image by extracting the generated panoramic scene texture for texture data, outputting the panoramic scene texture to a rendered result data queue, and outputting the rendered result data through a video IO card to obtain a 360 Degree VR panoramic graphic image with a key signal.

2. The method according to claim 1, wherein in the step of generating a CUBE texture map, real-time rendering all three-dimensional graphic images onto the spatial projection object comprises the following steps: establishing a local three-dimensional coordinate system with the camera position as an origin;

wherein, with a field angle FOV of 90 degrees, objects in the scene are respectively projected along the directions of the X, -X, Y, -Y, Z, and -Z axes of the three-dimensional coordinate system, and the combined rendering is performed six times, sky bounding boxes with six textured faces are merged to form six square texture maps to form a fully enclosed CUBE texture map.

3. The method according to claim 1, wherein after the panoramic scene texture is generated at an end of the panoramic rendering, a graphic acceleration card is instructed to acquire a texture data object interface, lock the texture data object, obtain texture data, and then unlock the texture data object and use these links to get texture data extraction.

4. The method according to claim 1, wherein the panoramic CUBE texture map is centered on the camera and includes rendered textures of all objects in the scene.

5. The method according to claim 1, wherein the panoramic scene map has an aspect ratio of 2:1.

6. The method according to claim 1, wherein in the step of generating a 360 degree VR panoramic graphic image, the step of outputting the panoramic scene texture to the rendered result data queue includes:

i) setting a critical lock and under protection thereof, wherein the data address is taken out from an empty data queue header, the calculated latest data is updated, and the data block is added with a timestamp and a parity field identifier, and the data block is added to the end of a data queue to be broadcast, and the empty data queue header is used for storing rendered result;

ii) in the video broadcast thread, when the broadcast instruction is obtained, under the protection of the critical lock, the data to be broadcasted and identified correctly is taken out from a head of the data queue to be broadcast according to the broadcast state, and sent to the board for broadcasting out;

iii) putting the broadcasted data cache into the end of the empty data queue to form a queue of 8-shaped structures.

* * * * *